United States Patent [19]

Molleron

[11] 4,109,109

[45] Aug. 22, 1978

[54] METHOD AND APPARATUS FOR DETECTING THE PRESENCE OF SIGNAL COMPONENTS OF PREDETERMINED FREQUENCY IN MULTIFREQUENCY PCM SIGNAL

[75] Inventor: Claude Auguste Molleron, Fontenay-aux-Roses, France

[73] Assignee: Societe Anonyme de Telecommunications, Paris, France

[21] Appl. No.: 652,647

[22] Filed: Jan. 26, 1976

[30] Foreign Application Priority Data

Jan. 31, 1975 [FR] France .................................. 75 03125

[51] Int. Cl.² .............................................. H04J 3/12
[52] U.S. Cl. ............................ 179/15 BY; 179/84 VF
[58] Field of Search ............ 179/15 BY, 84 VF, 15 A

[56] References Cited

U.S. PATENT DOCUMENTS

| 3,863,030 | 1/1975 | Mills | 179/84 VF |
|---|---|---|---|
| 3,882,283 | 5/1975 | Proudfoot | 179/84 VF |

Primary Examiner—David L. Stewart
Attorney, Agent, or Firm—Holman and Stern

[57] ABSTRACT

Method and apparatus for detecting the presence of signal components of predetermined frequency, in multifrequency PCM signal, especially in signalling tones. The incoming signal is multiplied by sine and cosine waveforms representing a particular frequency, for each of the frequencies to be detected, the two sets of multiplicands thus derived are summed. If the sum is greater than a reference value, said particular frequency is present in the incoming signal.

5 Claims, 2 Drawing Figures

METHOD AND APPARATUS FOR DETECTING THE PRESENCE OF SIGNAL COMPONENTS OF PREDETERMINED FREQUENCY IN MULTIFREQUENCY PCM SIGNAL

BACKGROUND OF THE INVENTION

The present invention relates to digital transmission by time division in which data are transmitted in the form of pulses grouped into time multiplexed words in the form of a reference frame and more particularly relates to the serial processing of these signals in terminal equipment.

In known multipath transmission methods the digital synchronous signals, for example, signals with a flow rate of 64 kilobits per second, are time-division multiplexed in an emitting station and are then transmitted on a multiplex digital path with a high flow rate, for example, at 2048 megabits per second, if multiplex digital path results from the multiplexing of 32 digital signals with 64 kilobits per second.

Multiplexed digital signals are conventionally produced from an analog signal by sampling, coding and logarithmic compression. The analog signal is made up from a finished group of frequencies, and usually comprises either one or two frequencies selected in said group. For example, in the case of signaling between switching offices, this signal consists of either two code frequencies or one control frequency.

Conventional signal detection methods involve restoring the analog signals and processing them with conventional filtering methods. Such a method requires the demultiplexing of the digital signal and its processing in digital-to-analog converters in order to restore an analog signal. This method calls for the path by path processing and for the same number of filters as there are frequencies within each path, each filter being adjusted separately. Such a method is referred to in the article by NIWA and SATO "Multifrequency receiver for pushbutton signaling using digital processing techniques," Proc. of National Electronics Conference, Chicago 1973.

Numerous articles have dealt with research on methods for the detection of multifrequency digital signals. One of these methods described in IEEE Transactions, Vol. 2, No. 12, December 1973, involves numerous operations, namely multiplications, squaring, and does not provide for the centralized processing of a reference frame.

SUMMARY OF THE INVENTION

To obviate these disadvantages the present invention has for its object a method for detecting the predetermined frequency components in signals resulting from the multiplexing of digital paths, said frequencies belonging to a group of standard frequencies, said signals being grouped into words distributed in the time slots of a reference frame and the instantaneous value of each of the incident signals being stored, comprising integrating, for each of the time slots of a reference frame and for each of the standard frequencies, the product of the instantaneous value of the incident signal by the instantaneous value of a digital signal characteristic of one of the standard frequencies along two separate paths, said characteristic signal being in sine form following one of the paths and in cosine form following the other path, and calculating the sum of the absolute values of the results obtained following each of the paths, said sum having a high value when the standard frequency is present in the incident signal, and being close to zero in the opposite case.

We will now consider the case where the incident signal is formed by a single frequency component $F_j$. It is a question of comparing this frequency $F_j$ with a standard frequency $F_o$. It is easy to show by calculation that the value of the expression $$\overline{\Delta_j(t)} = A_j \left| \int_0^T \sin(2\pi F_j t + \Phi_j)\sin 2\pi F_o t \, dt \right|$$

$$+ A_j \left| \int_0^T \sin(2\pi F_j t + \Phi_j)\cos 2\pi F_o t \, dt \right|$$

in which $T$ is the duration of integration and $A_j$ a real number, is close to zero when $F_j$ differs from $F_o$ and very high when $F_j$ is equal or very close to $F_o$. Therefore, this expression characterises the presence or absence of a frequency component $F_o$ or close to $F_o$ in the incident signal.

In the case where the incident signal contains several frequency components $F_j, F_k, \ldots$, it is formed by a linear combination and its instantaneous value reads:

$$A_j \sin(2\pi F_j t + \Phi_j) + A_k \sin(2\pi F_k t + \Phi_k) + \ldots$$

As the integration is a linear operation we obtain as a result $\overline{\Delta_j(t)} + \overline{\Delta_k(t)} + \ldots$ and as only one of the frequencies $F_j, F_k \ldots$ can be equal to $F_o$ there can only be one term among the $\Delta_j, \Delta_k, \ldots$ which has a high value, whilst all the others are close to zero.

Thus, the above expression makes it possible to detect the presence or absence of a frequency component $F_o$ in the incident signal, whatever the number of components contained therein.

The detection method according to the invention comprises storing in two read-only memories logarithmically compressed samples of said characteristic signals respectively in sine and cosine form, reading out these samples by sequential scanning of said memories and summating said samples along each of the paths with the instantaneous value of the incident digital signal, decompressing the sums obtained, summating along each of the paths the results of the decompression over a predetermined integration period and entering the result obtained along each of the paths into a store.

Such a method is applied more particularly to digital multifrequency receivers because they operate directly on the digital signal. It makes it possible to process serially with the same circuits all the paths of a PCM reference frame (pulse coding modulation) and all the frequencies. It also permits the elimination of coding and decoding of the analog signals as well as the difficult adjustment of the analog filters. It permits a decrease in the volume of the receiving system by simple operations. The method according to the invention consists of analysing the sum of the two sample types, each calculated and stored according to its own path, one forming the sine path and the other the cosine path. It is, therefore, easy to perform in series the calculations, i.e. the integrations for each standard frequency, whereby the calculation period lasts less than the PCM time slot (approximately 4 $\mu$s).

The method according to the invention also makes it possible to become independent of the phase. The phase has in fact no influence when $F_j$ and $F_o$ differ. On the other hand, if $F_j$ and $F_o$ are identical or very close, the value $\pi/2$ for the phase $\phi_j$ will reduce to zero one of the products, but the other will not be reduced to zero, permitting a detection. This illustrates the advantage of the two path processing, because in this case one path processing would give no detection for identical frequencies.

BRIEF DESCRIPTION OF THE DRAWING

Other and further objects of the present invention will be apparent from the following description and claims and are illustrated in the accompanying drawings which by way of illustration show preferred embodiments of the present invention and the principles thereof, and what are now considered to be the best modes contemplated for applying these principles. Other embodiments of the invention embodying the same or equivalent principles may be used and structural changes may be made as desired by those skilled in the art without departing from the invention and the scope of the appended claims. In the drawings show:

DETAILED DESCRIPTION OF A PREFERRED EMBODIMENT

Figure 1:
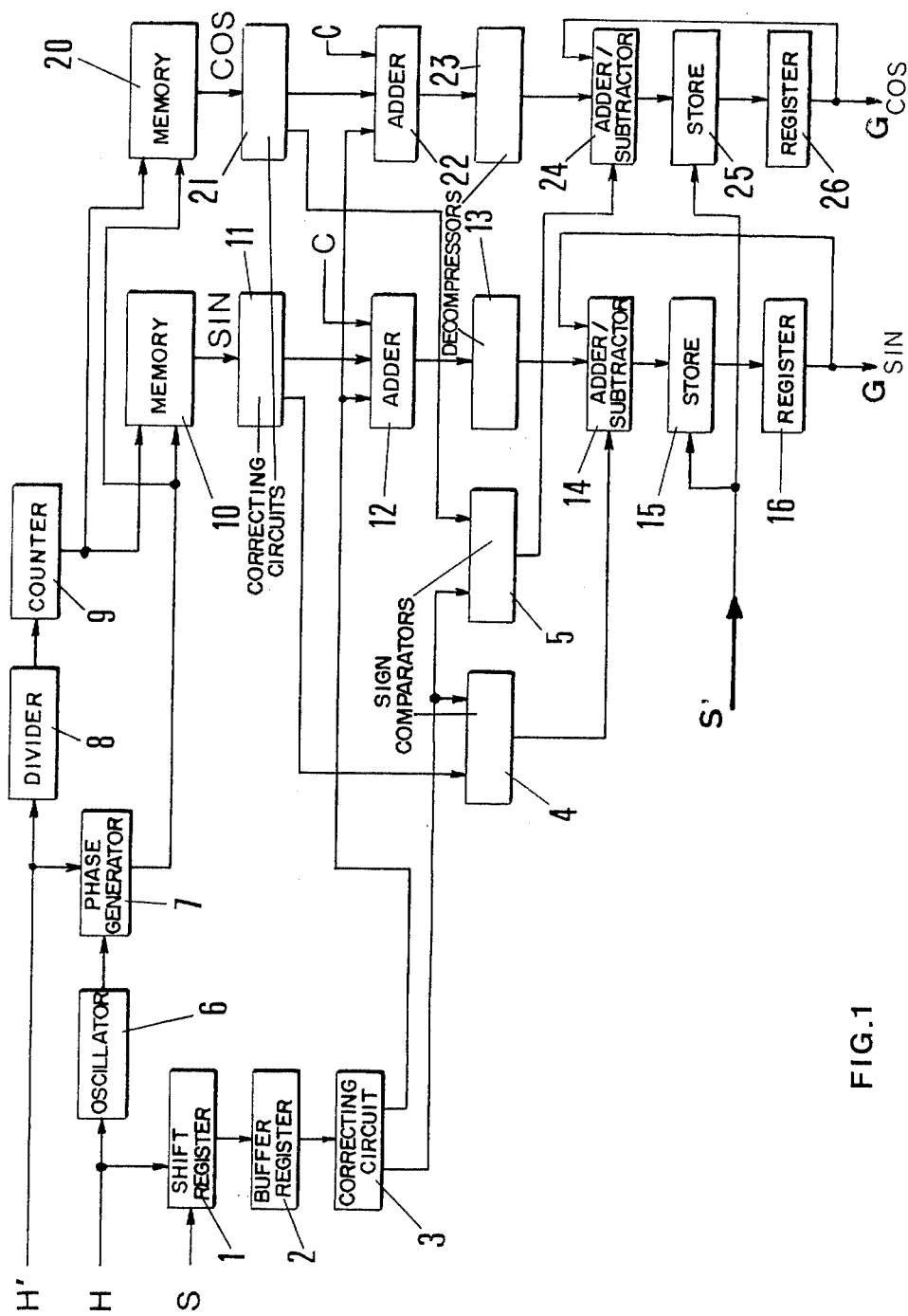
FIG. 1 a block diagram of a device for performing the frequency detection method following two paths in accordance with the invention.

The incident digital signal S of FIG. 1 is in the form of a sequence of 8 bits representing the sign and amplitude of the signal. Signal S is produced from an analog two frequency signal by sampling, coding and compression in accordance with an approximate logarithmic law.

According to FIG. 1 the digital multifrequency signal S is paralleled in a shift register 1 with the frequency of clock H, which e.g. operates at 2048 kHz, i.e. at the timing of signal S, and is then transferred at each time interval IT, of the order of 4µs (8 × 0.5 µs), into a buffer register 2. Data from buffer register 2 are fed to a correcting circuit 3 which is a combinative logic supplying an exact logarithm from the amplitude of signal S following one path and the sign of the other signal following the other path to 4 and 5. The compression law is only approximately logarithmic, and it is necessary to correct the value of the sample for low level signals. This correction is performed by means of correcting circuit 3 designed to supply exact logarithms from the approximate values fed thereto.

The timing pulse H, e.g. of 2048 kHz, is fed to a controlled oscillator 6 which supplies a timing signal at 4096 kHz in phase with the timing pulse. This latter timing signal acts on a phase generator 7 which is synchronised by a clock H' and supplies addressing signals to memories 10 and 20 containing coded samples of the standard frequencies. The clock H' controlled by clock H supplies a timing signal at 256 kHz which serves to count the time slots IT, of the order of 4 µs. This timing signal H' acts on a divider 8 which divides by the number N of paths forming the signal, which supplies a reference frame frequency of 8 kHz if N is equal to 32. A counter 9 permits, by a sequential scanning of the addresses, the reading out of samples of all the frequencies contained in memories 10 and 20. This scanning of all the reference frames makes it possible to read out a sample of each frequency for each reference frame. Memories 10 and 20 are read-only memories containing respectively samples in sine and cosine form of signals which are representative of the standard frequency. Within each time slot IT = 4 µs, the phase generator 7 permits to read out serially the sample of all the standard frequencies. The same samples will be used for processing all the paths of one reference frame. The number of samples chosen is a function of the number of standard frequencies and of the recurrence rate of the reference frame. The samples read out from memories 10 and 20 are fed to two correcting circuits 11 and 21 respectively, similar to correcting circuit 3, which correct the compression law of the samples contained in memories 10 and 20 and supply exact logarithms.

This method makes it possible to replace a product of two values by a simple addition of logarithms before decompression. The thus obtained signals are then summated, each according to its own path in adders 12 and 22. This summation relates to three terms: the amplitude of the incident signal in logarithm form from correcting circuit 3, the sample in logarithm form from correcting circuits 11 and 21 and a correction constant C making it possible to obtain easily handled numbers during decompression.

The signal thus delivered by 12 (or 22) is then decompressed at 13 (or 23) before integration. The purely combinative decompression logic circuit supplies the amplitude of the product according to a linear coding. The thus obtained signal is integrated in adders - substracters 14 and 24. The operation is a sum if the signs from correcting circuit 3 and correcting circuits 11 and 21 are identical; it is a difference in the opposite case. The values obtained as a result for each path are entered into two stores 15 and 25.

A series signal S' formed by the addresses of time slots IT of incident signal S supplies the addresses of time slots IT to stores 15 and 25. During a 250 ns phase, corresponding to the above-mentioned frequency of 4096 kHz, stores 15 and 25 are read out and their data are buffered in registers 16 and 26, respectively. During the following phase of 250 ns, the data from adders-substracters 14 and 24 are entered into stores 15 and 25, and so on. A time slot IT thus comprises eight read out phases and eight enter phases in alternation, each standard frequency corresponding to two consecutive phases, one for reading out and one for entering.

This multifrequency signal processing method makes it possible to supply along two paths values characteristic of signals $G_{sin}$ and $G_{cos}$ by simple additions of data stored in stores. The capacity of these stores is a function of the number of samples which it is necessary to store.

Detection operation simulations according to the invention have shown that quantification causes little change in the results of the calculation. On the other hand, the integration time is a compromise selected between a minimum duration permitting the elimination of spurious terms due to bursts and a maximum duration for cancelling out the frequency variations of the incident signal frequencies relative to the theoretical frequencies emitted.

Figure 2:
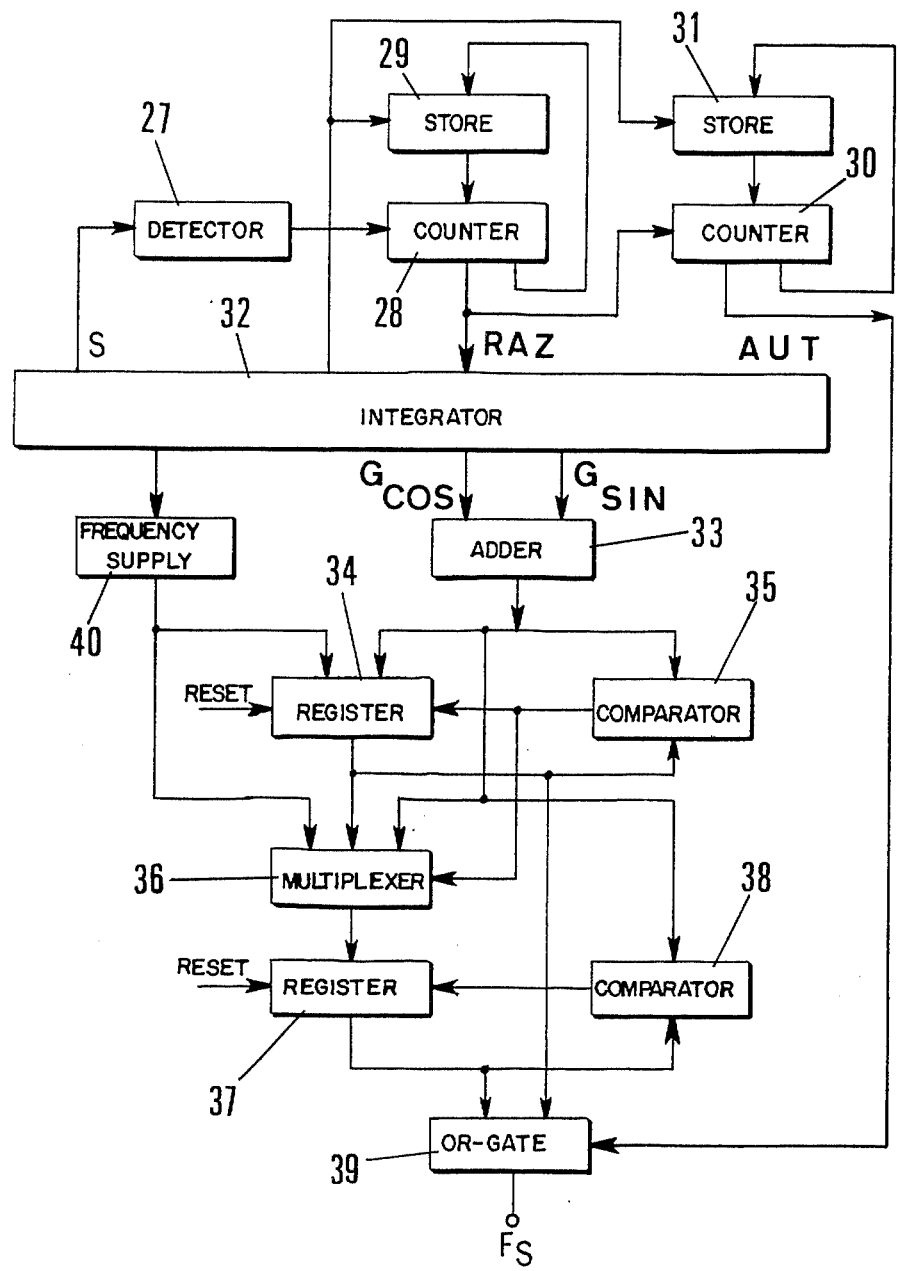
FIG. 2 is a block diagram of a multifrequency signal receiver operating in accordance with the method of the invention.

FIG. 2 shows a multifrequency receiver using the synchronous detection method according to the invention in a preferred embodiment. This receiver comprises a detector 27 of the level of signal S from register 2 shown in FIG. 1. Throughout the integration period the signal must exceed a certain amplitude to be taken into account. In the embodiment described a signal S exceeds a selective level when the compressed amplitude of at least one sample selected from among $D_1$ samples is greater than a corresponding detection threshold, $D_1$ being a natural integer. The level detector 27 tests all the samples and supplies a signal to a counter 28 if the sample exceeds the selected level.

The content of a level processing store 29, addressed by the position of the time slot IT during processing is transferred at each time slot IT to a counter 28. Incrementation of this counter 28 takes place until its content becomes equal to $D_1-1$, and is zeroed when the detected level exceeds the threshold. After processing the content of counter 28 is again fed into store 29. When the counter is blocked at $D_1-1$, because the incident signal does not exceed the threshold a RAZ signal is generated. This RAZ signal keeps the integration result at zero by acting on stores 15 and 25 of FIG. 1.

The receiver according to the invention also comprises an integration period generator. The content of an integration period store 31, addressed by the position of the time slot during processing is transferred to a counter 30. Incrementation of counter 30 takes place until its content is equal to $D_2-1$, $D_2$ being a natural integer and it is zeroed if the RAZ signal is generated. After processing the content of the counter is again fed into the store. When the counter blocks at $D_2-1$ the integration time has run out and a AUT signal is generated.

The sine and cosine samples of the standard frequencies are read out for all the reference frames and then processed with the samples of the incident digital multifrequency signal along each of the two paths (10 to 16) and (20 to 26) of an integrator 32 comprising the device of FIG. 1. Integrator 32 is controlled by the RAZ signal transmitted by the level processing counter 28. This integrator supplies two types of signals $G_{sin}$ and $G_{cos}$. An adder 33 calculates the sum of the absolute values of the two coded values $G_{sin}$ and $G_{cos}$. A device 40, connected to phase generator 7, supplies the standard frequency for which the result has been obtained. This frequency is supplied by device 40 in binary position code.

Two registers 34 and 37 define among the frequencies contained in memories 10 and 20 the two frequencies giving the highest results on leaving adder 33. Registers 34 and 37 are zeroed at the beginning of each time slot IT. At the corresponding times a comparator 35 compares the binary word contained in register 34 with that from adder 33.

If the binary coded result from adder 33 exceeds the result contained in register 34, comparator 35 validates the charging of register 34 with the new frequency from device 40 and the binary word from adder 33 which form the new result. A multiplexer 36 receives the result supplied by register 34 and adder 33. The function of this multiplexer is the choice of data and the charging of the second register 37. The operation of register 37, associated with comparator 35 is similar to that of register 34. The binary words charged into register 37 come either from register 34, if the new result exceeds those contained in register 34 and 37, or from adder 33, if the new result is between those contained in registers 34 and 37.

At the end of time slot IT an OR gate 39 receives the binary words from registers 34 and 37 and supplies the detected frequencies $F_S$ in binary position code. This data can be used provided that the AUT signal generated by counter 30 is present.

The embodiment described relates to a multifrequency receiver of capacity 2048 megabits per second, but obviously extends to any other capacity if appropriate dimensions are given to the stores and registers used.

Exact and approximate frequency simulations have confirmed the presence of high results when the standard frequency is close to an incident signal frequency. A certain variation of frequency relative to the nominal value compatible with the calculation results is allowed.

The invention is not limited to the embodiments described and represented hereinbefore and various modifications can be made thereto without passing beyond the scope of the invention.

What I claim is:

1. A method for detecting the presence of signal components of a predetermined frequency in multifrequency PCM signals, wherein said frequencies belong to a group of standard frequencies, said signals are grouped into words distributed in time slots of a reference frame and the instantaneous value of each of the incoming signals is stored, said method comprising the steps of: integrating, for each of the time slots of a reference frame and for each of the standard frequencies, the product of the instantaneous value of the incoming signal by the instantaneous value of a digital signal characteristic of one of the standard frequencies along two separate paths, the said characteristic signal being in sine form following one of the paths and in cosine form following the other path; and calculating the sum of the absolute values of the results obtained following each of the paths, said sum having a high value when said predetermined frequency is present in the incoming signal, and being close to zero in the opposite case.

2. A method according to claim 1 comprising the additional steps of: storing in two read-only memories logarithmically compressed samples of said characteristic signals respectively in sine and cosine form; reading out these samples by sequential scanning of said memories; summing said samples along each of the paths with the instantaneous value of the incoming digital signal; decompressing the sums obtained; summing along each of paths the results of the decompression over a predetermined integration period; and entering the result obtained along each of the paths into a store.

3. A digital multifrequency receiver for detecting the presence of signal components of a predetermined frequency in multifrequency PCM signals said frequency belonging to a group of standard frequencies, said receiver comprising:
   a buffer register for storing a multiplexed incoming signal;
   two memories containing respectively, in sine and cosine form, samples of the characteristic signals of the standard frequencies;
   an integrator for integrating the product of the incoming signal by signals from each of the stores providing two integrated outputs, said integrator comprising two adders/subtractors, an adder supplying the sum of the integrator outputs, integrator and a selector identifying said predetermined frequencies contained in the incoming signal from the result given by the adder.

4. A receiver according to claim 3, wherein said selector comprises:
   two registers, each responsive to one of said two memories, for defining two frequencies giving the highest result from the adder; and two comparators, each responsive to the frequency defined in a corresponding register and said adder, for enabling the output of said register to provide the sought frequencies.

5. A receiver according to claim 4, wherein said integrator further comprises a level detector, responsive to an output of said buffer register, for providing an output when said buffer register output is above a predetermined level, said detector output controlling said integrator.

* * * * *